United States Patent
Glazemakers et al.

(10) Patent No.: US 10,979,398 B2
(45) Date of Patent: *Apr. 13, 2021

(54) SYSTEMS AND METHODS FOR PROTECTING NETWORK DEVICES BY A FIREWALL

(71) Applicant: Cryptzone North America, Inc., Waltham, MA (US)

(72) Inventors: Kurt Glazemakers, Grembergen (BE); Malcolm Hamilton, Littlehampton (GB); Gokhan Berberoglu, Gothenburg (SE)

(73) Assignee: Cryptzone North America, Inc., Waltham, MA (US)

( * ) Notice: Subject to any disclaimer, the term of this patent is extended or adjusted under 35 U.S.C. 154(b) by 107 days.

This patent is subject to a terminal disclaimer.

(21) Appl. No.: 16/207,566

(22) Filed: Dec. 3, 2018

(65) Prior Publication Data

US 2019/0116156 A1 Apr. 18, 2019

Related U.S. Application Data

(63) Continuation of application No. 15/853,178, filed on Dec. 22, 2017, now Pat. No. 10,193,869, which is a continuation of application No. 14/828,357, filed on Aug. 17, 2015, now Pat. No. 9,853,947, which is a continuation of application No. 14/578,140, filed on Dec. 19, 2014, now Pat. No. 9,148,408.

(60) Provisional application No. 62/060,427, filed on Oct. 6, 2014.

(51) Int. Cl.
*H04L 29/06* (2006.01)

(52) U.S. Cl.
CPC ........ *H04L 63/029* (2013.01); *H04L 63/0272* (2013.01); *H04L 63/08* (2013.01); *H04L 63/101* (2013.01); *H04L 63/20* (2013.01)

(58) Field of Classification Search
CPC ..... H04L 63/029; H04L 63/20; H04L 63/101; H04L 63/08; H04L 63/0272; H04L 29/06
See application file for complete search history.

(56) References Cited

U.S. PATENT DOCUMENTS

| | | | |
|---|---|---|---|
| 5,889,942 | A | 3/1999 | Orenshteyn |
| 6,381,631 | B1 | 4/2002 | van Hoff |
| 6,766,454 | B1 | 7/2004 | Riggins |
| 6,898,710 | B1 | 5/2005 | Aull |

(Continued)

FOREIGN PATENT DOCUMENTS

| | | |
|---|---|---|
| EP | 1782265 | 5/2007 |
| EP | 2144460 | 1/2010 |

(Continued)

OTHER PUBLICATIONS

AppGate 10.2.3 manual, 2004.

(Continued)

*Primary Examiner* — Darren B Schwartz
(74) *Attorney, Agent, or Firm* — Greenberg Traurig

(57) ABSTRACT

Embodiments of the present disclosure help protect network devices from unauthorized access. Among other things, embodiments of the disclosure allow full access to application servers and other network devices that a client is allowed to access, while preventing all access (or even knowledge) of network devices the client is not allowed to access.

20 Claims, 10 Drawing Sheets

(56) References Cited

U.S. PATENT DOCUMENTS

| | | |
|---|---|---|
| 7,245,619 B1 | 7/2007 | Guan et al. |
| 7,359,974 B1 | 4/2008 | Quinn et al. |
| 7,444,518 B1 | 10/2008 | Dharmarajan et al. |
| 7,574,737 B1 | 8/2009 | Loh |
| 7,661,131 B1 | 2/2010 | Shaw et al. |
| 7,665,130 B2 | 2/2010 | Johnston et al. |
| 7,673,048 B1 | 3/2010 | O'Toole, Jr. et al. |
| 7,721,084 B2 | 5/2010 | Salminen et al. |
| 7,809,003 B2 | 10/2010 | Makela |
| 7,904,952 B2 | 3/2011 | Yeap et al. |
| 7,954,144 B1 | 5/2011 | Ebrahimi et al. |
| 8,001,610 B1 | 8/2011 | Chickering et al. |
| 8,028,071 B1 | 9/2011 | Mahalingam et al. |
| 8,353,021 B1 | 1/2013 | Satish et al. |
| 8,429,232 B1 | 4/2013 | Appenzeller et al. |
| 8,549,173 B1 | 10/2013 | Wu et al. |
| 8,549,300 B1* | 10/2013 | Kumar ............ H04L 9/3247 |
| | | 713/153 |
| 8,601,569 B2 | 12/2013 | Segre et al. |
| 8,819,763 B1 | 8/2014 | Cheung et al. |
| 8,868,757 B1 | 10/2014 | Liu et al. |
| 9,088,615 B1* | 7/2015 | Avlasov ............ H04L 63/20 |
| 9,148,408 B1 | 9/2015 | Glazemakers et al. |
| 9,300,629 B1 | 3/2016 | Jahr |
| 9,363,282 B1 | 6/2016 | Yu et al. |
| 9,432,333 B2 | 8/2016 | Dhaene |
| 9,485,279 B2 | 11/2016 | Kimer et al. |
| 9,509,574 B2 | 11/2016 | Kimer et al. |
| 9,553,768 B2 | 1/2017 | Scott et al. |
| 9,560,015 B1 | 1/2017 | Glazemakers et al. |
| 9,628,444 B1 | 4/2017 | Glazemakers et al. |
| 9,736,120 B2 | 8/2017 | Glazemakers et al. |
| 9,853,947 B2 | 12/2017 | Glazemakers et al. |
| 9,866,519 B2 | 1/2018 | Glazemakers et al. |
| 9,906,497 B2 | 2/2018 | Glazemakers et al. |
| 9,992,185 B1 | 6/2018 | Basha P.R., et al. |
| 10,063,521 B2 | 8/2018 | Glazemakers et al. |
| 10,193,869 B2 | 1/2019 | Glazemakers et al. |
| 2002/0023210 A1 | 2/2002 | Tuomenoksa et al. |
| 2002/0026503 A1 | 2/2002 | Bendinelli et al. |
| 2002/0026531 A1 | 2/2002 | Keane et al. |
| 2002/0049914 A1 | 4/2002 | Inoue et al. |
| 2002/0053031 A1 | 5/2002 | Bendinelli et al. |
| 2002/0091859 A1 | 7/2002 | Tuomenoksa et al. |
| 2002/0093915 A1 | 7/2002 | Larson |
| 2002/0099937 A1 | 7/2002 | Tuomenoksa |
| 2003/0009693 A1 | 1/2003 | Brock et al. |
| 2003/0028805 A1 | 2/2003 | Lahteenmaki |
| 2003/0041091 A1 | 2/2003 | Cheline et al. |
| 2003/0041136 A1 | 2/2003 | Cheline et al. |
| 2003/0051169 A1 | 3/2003 | Sprigg et al. |
| 2003/0055990 A1 | 3/2003 | Cheline et al. |
| 2003/0055994 A1* | 3/2003 | Herrmann ......... H04L 12/2876 |
| | | 709/229 |
| 2003/0131263 A1 | 7/2003 | Keane et al. |
| 2003/0145104 A1 | 7/2003 | Boden et al. |
| 2003/0145226 A1 | 7/2003 | Bruton, III et al. |
| 2003/0200321 A1 | 10/2003 | Chen et al. |
| 2003/0216143 A1 | 11/2003 | Roese et al. |
| 2003/0237004 A1* | 12/2003 | Okamura ............ H04L 63/0272 |
| | | 726/15 |
| 2004/0044910 A1 | 3/2004 | Ylipieti |
| 2004/0073666 A1 | 4/2004 | Foster et al. |
| 2004/0078573 A1 | 4/2004 | Matsuyama |
| 2004/0088542 A1 | 5/2004 | Daude et al. |
| 2004/0103283 A1* | 5/2004 | Hornak ............ H04L 63/166 |
| | | 713/175 |
| 2004/0167954 A1 | 8/2004 | Griessing |
| 2004/0167984 A1 | 8/2004 | Herrmann |
| 2004/0268121 A1 | 12/2004 | Shelest et al. |
| 2005/0076198 A1* | 4/2005 | Skomra ............ H04L 63/0823 |
| | | 713/156 |
| 2005/0165889 A1 | 7/2005 | Muret et al. |
| 2005/0210067 A1 | 9/2005 | Nakatani et al. |
| 2005/0223095 A1 | 10/2005 | Volz et al. |
| 2005/0246767 A1 | 11/2005 | Fazal et al. |
| 2005/0273850 A1* | 12/2005 | Freund ............ H04L 63/0227 |
| | | 726/14 |
| 2005/0273853 A1 | 12/2005 | Oba et al. |
| 2006/0004662 A1* | 1/2006 | Nadalin ............ H04L 9/0825 |
| | | 705/50 |
| 2006/0005237 A1* | 1/2006 | Kobata ............ H04L 63/123 |
| | | 726/12 |
| 2006/0037072 A1 | 2/2006 | Rao et al. |
| 2006/0037075 A1 | 2/2006 | Frattura et al. |
| 2006/0041756 A1 | 2/2006 | Ashok et al. |
| 2006/0053296 A1 | 3/2006 | Busboom et al. |
| 2006/0059370 A1 | 3/2006 | Asnis et al. |
| 2006/0143702 A1 | 6/2006 | Hisada et al. |
| 2006/0161965 A1 | 7/2006 | Shelest et al. |
| 2006/0190987 A1 | 8/2006 | Ohta et al. |
| 2006/0248337 A1 | 11/2006 | Koodli |
| 2007/0074049 A1 | 3/2007 | Frenkel et al. |
| 2007/0101405 A1 | 5/2007 | Engle et al. |
| 2007/0136805 A1* | 6/2007 | Perry ............ H04L 63/0272 |
| | | 726/14 |
| 2007/0209081 A1 | 9/2007 | Morris |
| 2007/0299954 A1 | 12/2007 | Fatula |
| 2007/0300296 A1 | 12/2007 | Kudla et al. |
| 2008/0004699 A1 | 1/2008 | Ben Nun |
| 2008/0028436 A1 | 1/2008 | Hannel et al. |
| 2008/0046995 A1 | 2/2008 | Satterlee et al. |
| 2008/0052775 A1 | 2/2008 | Sandhu et al. |
| 2008/0072312 A1 | 3/2008 | Takeyoshi et al. |
| 2008/0082640 A1 | 4/2008 | Chang et al. |
| 2008/0098472 A1 | 4/2008 | Enomoto et al. |
| 2008/0130897 A1 | 6/2008 | Donatelli et al. |
| 2008/0178278 A1 | 7/2008 | Grinstein et al. |
| 2008/0235755 A1 | 9/2008 | Blaisdell et al. |
| 2008/0301801 A1 | 12/2008 | Jothimani |
| 2009/0031415 A1 | 1/2009 | Aldridge et al. |
| 2009/0113540 A1 | 4/2009 | Chandwani |
| 2009/0119749 A1 | 5/2009 | Datla et al. |
| 2009/0249440 A1 | 10/2009 | Platt et al. |
| 2009/0254970 A1 | 10/2009 | Agarwal et al. |
| 2009/0300750 A1 | 12/2009 | Chou et al. |
| 2009/0328219 A1 | 12/2009 | Narayanaswamy |
| 2010/0175124 A1 | 7/2010 | Miranda |
| 2010/0205657 A1 | 8/2010 | Manring et al. |
| 2010/0217975 A1* | 8/2010 | Grajek ............ G06F 21/445 |
| | | 713/157 |
| 2010/0306530 A1 | 12/2010 | Johnson et al. |
| 2010/0313078 A1* | 12/2010 | Burckart ............ H04L 67/143 |
| | | 714/48 |
| 2011/0016509 A1 | 1/2011 | Huang et al. |
| 2011/0030045 A1 | 2/2011 | Beauregard et al. |
| 2011/0107411 A1 | 5/2011 | McClain et al. |
| 2011/0252230 A1 | 10/2011 | Segre et al. |
| 2011/0252459 A1 | 10/2011 | Walsh et al. |
| 2011/0264910 A1* | 10/2011 | Masuda ............ H04L 63/06 |
| | | 713/155 |
| 2011/0282997 A1 | 11/2011 | Prince et al. |
| 2011/0307947 A1 | 12/2011 | Kariv et al. |
| 2011/0314532 A1* | 12/2011 | Austin ............ H04L 63/0892 |
| | | 726/8 |
| 2012/0002813 A1* | 1/2012 | Wei ............ H04L 63/0272 |
| | | 380/270 |
| 2012/0036233 A1 | 2/2012 | Scahill et al. |
| 2012/0078994 A1 | 3/2012 | Jackowski et al. |
| 2012/0124239 A1 | 5/2012 | Shribman et al. |
| 2012/0167196 A1 | 6/2012 | Colar et al. |
| 2012/0198535 A1 | 8/2012 | Oberheide et al. |
| 2012/0198541 A1* | 8/2012 | Reeves ............ H04L 63/1441 |
| | | 726/13 |
| 2012/0210002 A1 | 8/2012 | McQuade |
| 2012/0233712 A1 | 9/2012 | Falk et al. |
| 2012/0278878 A1 | 11/2012 | Barkie et al. |
| 2012/0324442 A1 | 12/2012 | Barde |
| 2013/0133027 A1 | 5/2013 | Chickering et al. |
| 2013/0205366 A1 | 8/2013 | Luna et al. |
| 2013/0247142 A1 | 9/2013 | Nishizawa et al. |
| 2013/0268643 A1 | 10/2013 | Chang et al. |

(56) References Cited

U.S. PATENT DOCUMENTS

| | | |
|---|---|---|
| 2013/0332724 A1 | 12/2013 | Walters |
| 2014/0006347 A1 | 1/2014 | Qureshi et al. |
| 2014/0052838 A1 | 2/2014 | Giacomoni et al. |
| 2014/0095865 A1* | 4/2014 | Yerra .............. H04L 63/0823 713/156 |
| 2014/0109175 A1 | 4/2014 | Barton et al. |
| 2014/0181968 A1* | 6/2014 | Ge ................ H04L 63/1425 726/23 |
| 2014/0223541 A1 | 8/2014 | Yoon et al. |
| 2014/0245423 A1 | 8/2014 | Lee |
| 2014/0282914 A1 | 9/2014 | Holmelin et al. |
| 2014/0351413 A1 | 11/2014 | Smith et al. |
| 2014/0359160 A1 | 12/2014 | Elhaddad et al. |
| 2015/0009831 A1 | 1/2015 | Graf |
| 2015/0135265 A1 | 5/2015 | Bagrin |
| 2015/0172064 A1* | 6/2015 | Takenaka ............ H04L 9/3247 713/156 |
| 2015/0212867 A1 | 7/2015 | Klee et al. |
| 2015/0215207 A1 | 7/2015 | Qin et al. |
| 2015/0244711 A1 | 8/2015 | Venkataraman et al. |
| 2015/0293756 A1 | 10/2015 | Wright |
| 2015/0341443 A1 | 11/2015 | Shen et al. |
| 2016/0099916 A1 | 4/2016 | Glazemakers et al. |
| 2016/0099917 A1 | 4/2016 | Glazemakers et al. |
| 2016/0112374 A1 | 4/2016 | Branca |
| 2017/0111310 A1 | 4/2017 | Glazemakers et al. |
| 2017/0111317 A1 | 4/2017 | Glazemakers et al. |
| 2017/0230333 A1 | 8/2017 | Glazemakers et al. |
| 2017/0295140 A1 | 10/2017 | Glazemakers et al. |
| 2017/0346811 A1 | 11/2017 | Newell et al. |
| 2017/0359307 A1 | 12/2017 | Glazemakers et al. |
| 2018/0069826 A1 | 3/2018 | Glazemakers et al. |
| 2018/0139177 A1 | 5/2018 | Glazemakers et al. |
| 2018/0183763 A1 | 6/2018 | Glazemakers et al. |

FOREIGN PATENT DOCUMENTS

| | | |
|---|---|---|
| WO | 2006012612 | 2/2006 |
| WO | 2006014842 | 2/2006 |
| WO | 2010069058 | 6/2010 |
| WO | 2016036391 | 3/2016 |

OTHER PUBLICATIONS

European Patent Application No. 15848610.0, extended European search report, dated Sep. 5, 2017.

European Patent Application No. 15881395.6 extended European search report, dated Oct. 4, 2018, 8 pages.

Hidekazu, Suzuki et al., Design and Implementation of IP Mobility Communication Technology on User Space, DICOMO2014 Multimedia, Distributed, Cooperative, and Mobile Symposium, vol. 2014 No. 1, Information Processing Society of Japan, Jul. 2, 2014, pp. 1319-1325.

Internationa Patent Application PCT/US2016/036053, International Search Report and Written Opinion, dated Jun. 24, 2016.

International Patent Application PCT/US2015/050485 International Search Report and Written Opinion, dated Jan. 12, 2016.

International Patent Application PCT/US2015/063783 International Search Report and Written Opinion, dated Mar. 1, 2016.

International Patent Application PCT/US2016/036238, International Search Report and Written Opinion, dated Sep. 2, 2016.

Shen, Yan et al., A Multi-Tunnel VPN Concurrent System for New Generation Network Based on User Space, 2012 IEEE 11th International Conference on Trust, Security and Privacy in Computing and Communications, IEEE, 2012, pp. 1334-1341.

Wang, Song et al., A distributed object-based IPSec multi-tunnels concurrent architecture, 2011 International Conference on Computational Problem-Solving (ICCP), IEEE, 2011, pp. 471-476.

* cited by examiner

SYSTEMS AND METHODS FOR PROTECTING NETWORK DEVICES BY A FIREWALL

CROSS-REFERENCES TO RELATED APPLICATION

This application is continuation application of U.S. patent application Ser. No. 15/853,178, filed Dec. 22, 2017 and entitled "Systems and Methods for Protecting Network Devices by a Firewall", which is continuation application of U.S. patent application Ser. No. 14/828,357, filed Aug. 17, 2015 and issued as U.S. Pat. No. 9,853,947 on Dec. 26, 2017, and entitled "Systems and Methods for Protecting Network Devices", which is continuation application of U.S. patent application Ser. No. 14/578,140, filed Dec. 19, 2014 and issued as U.S. Pat. No. 9,148,408 on Sep. 29, 2015, and entitled "Systems and Methods for Protecting Network Devices" which claims priority to U.S. Provisional Pat. App. No. 62/060,427, filed Oct. 6, 2014 and entitled "System, Devices and Methods for Protecting Networking Devices", the disclosures of which are hereby incorporated herein by references.

BACKGROUND

In a client-server network model, companies or service providers typically offer services and/or applications to client computers and to other services over a computer network. Servers and associated services may include, for example, mail servers, file servers, Customer Relationship Management or CRM services, Enterprise Resource Planning or ERP services, document management services, and the like.

On the one hand, security needs to be guaranteed by restricting the access to these services to trusted users and clients only. On the other hand, trusted users need access to the services in an easy and straightforward manner. Preferably, the services can be reached from anywhere at any time. With the "Bring your own device" (or "BYOD") policy finding more and more acceptance in companies, services should also be reachable from "anything", i.e., from any device owned by a trusted user such as for example a tablet computer, a laptop computer, his computer at home or a smartphone.

Various conventional approaches exist to attempt to prevent unauthorized access to such application servers or to the services or applications served by these application servers. For example, placing application servers within a private network is itself a security measure as it isolates the companies network, Local Area Network (or "LAN") from the Internet and other external public networks. Devices, and thus services, inside the private network are not visible from the public network. The content of the traffic in the private network, and the manner the traffic can traverse the company's network boundaries, can be regulated and monitored by using Network Address Translation (NAT), firewall rules and proxies in the gateway devices separating the WAN from the company's private network. Private networks may further be subdivided physically or virtually by for example Virtual LAN's in order to further separate applications servers from potential unauthorized access by clients within the company's private network.

Network level security may be enforced on a user by user or a client by client basis, such as by configuring a client's firewall to (by default) only have access to an authentication server. When the client is authorized, the client's firewall is opened and all network devices are configured to let pass the client's network traffic to application servers it has been granted access to.

Network level security on a client or user level may also be attempted by a controller generating access rights for users based on identity profiles and health profiles. The controller then configures a protection device thereby providing network access to a set of servers.

The enforcement of network level security in an accepting host may be attempted by configuring the host by a controller. When an initiating host is authorized access to an accepting host, the controller configures the accepting host to accept network connections from the initiating host.

Security within a private network may further be enforced by application level security where user or clients can only access the services on the servers after authentication. In such case a client may find the application server within the network, for example by its IP network address and may find the service running on the application server by its TCP or UDP port number, but the service or application itself may deny the client or user based on authentication credentials. Such authentication may be locally managed by the individual services or centrally by an authentication server. The services then check the authentication credentials against such an authentication server before granting a user and/or client access to a certain service.

Access to a company's private network may by established by a VPN or the Virtual Private Network where a secured networking tunnel is setup between a client device and the private network. The setup of such a tunnel is only granted by authentication with a VPN server. Different authorization schemes exist to ensure that only trusted users and/or clients can join a VPN.

Another solution for providing access to services in a company's private network is by opening up outside access to some services. For example, an email server may allow connections from outside so that users can check their email when they are not in the company. These services are sometimes restricted by only providing access through a specific interface such as for example through the company's website so that the client does not have physical network access to the server running the service but only to a web server providing a subset of the services.

In risk based authentication, access to services is not only granted based on identification of the user and/or client by authentication credentials, but also based on further metrics in order to derive a level of trust appropriate to the risk level. Such metrics are for example: the location of the user, the type of client, the operating system, if all security patches have been installed, the logon history of the user etc. This way a user logging on by VPN may be restricted from services he would not be restricted from when logging on from within the private network. Or a user logging on from within the private network with his own device may be denied some services.

SUMMARY

Embodiments of the present disclosure help protect network devices from unauthorized access. Among other things, embodiments of the disclosure allow full access to application servers and other network devices that a client is allowed to access, while preventing all access (or even knowledge) of network devices the client is not allowed to access.

A computer-implemented method according to one embodiment of the present disclosure includes: receiving, by a computer system implementing a gateway to a private network, a request from a client device for a network tunnel between the client device and a network device in the private network; and authenticating the client device by the computer system by at least verifying a digital signature via a signature key shared between the gateway and an authentication server.

The present disclosure includes various methods, apparatuses (including computer systems) that perform such methods, and computer readable media containing instructions that, when executed by computing systems, cause the computing systems to perform such methods.

Other features will be apparent from the accompanying drawings and from the detailed description which follows.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Any combination and/or subset of the elements of the methods depicted herein may be combined with each other, selectively performed or not performed based on various conditions, repeated any desired number of times, and practiced in any suitable order and in conjunction with any suitable system, device, and/or process. The methods described and depicted herein can be implemented in any suitable manner, such as through software operating on one or more computer systems. The software may comprise computer-readable instructions stored in a tangible computer-readable medium (such as the memory of a computer system) and can be executed by one or more processors to perform the methods of various embodiments.

Figure 1:
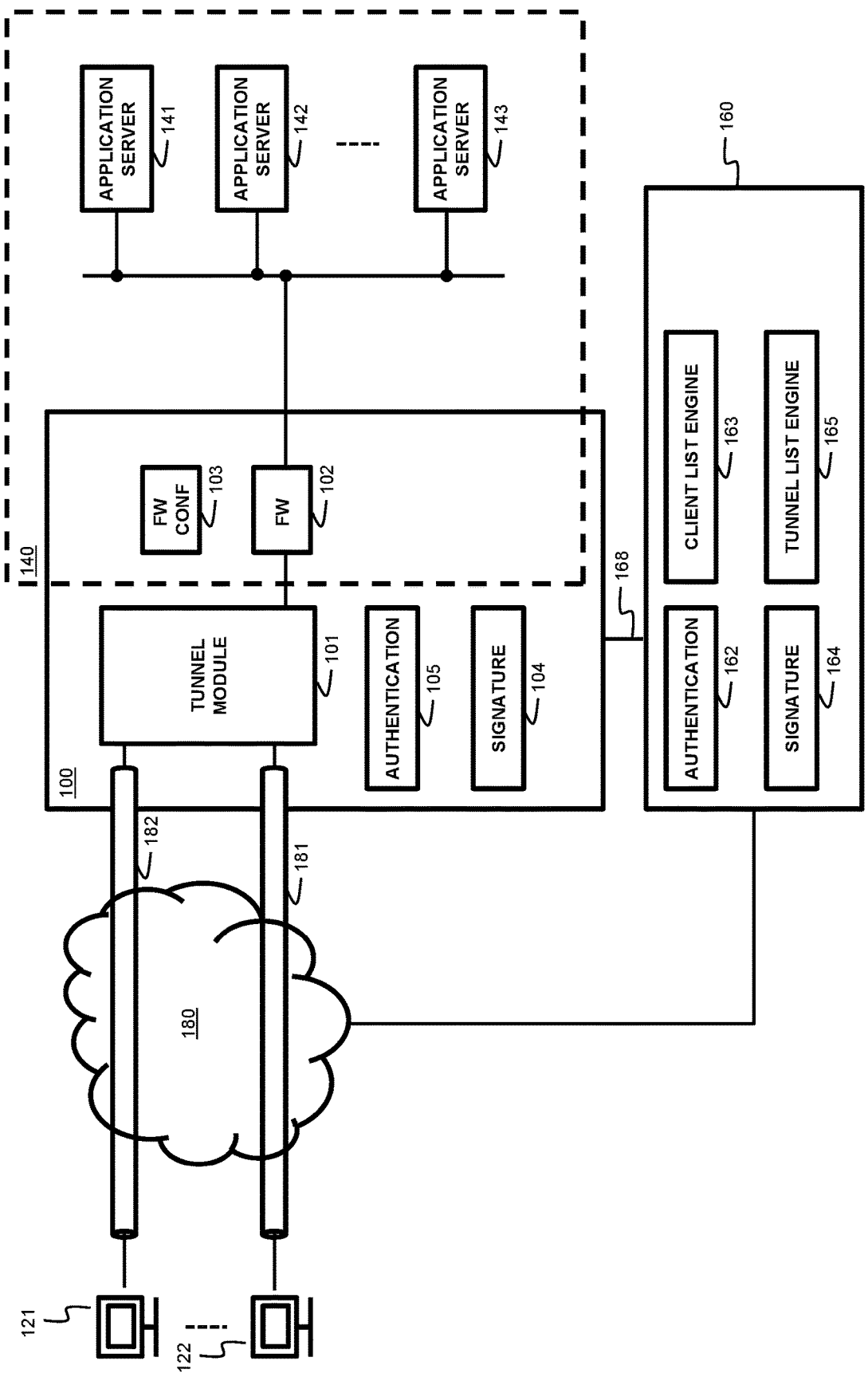
FIG. 1 is an exemplary system for protecting network devices from network access by untrusted client devices according to various aspects of the disclosure.

FIG. 1 illustrates an exemplary system for the protection of network devices from unwanted network access according to various aspects of the present disclosure. In this example, three network devices (application servers 141, 142 and 143) are part of a private network 140. Access to the servers 141-143 is obtained from within the private network 140 via a private network address. In this context, the term "private" refers to the fact that the application servers 141-143 are not globally routable. In other words, the application servers 141-143 cannot be addressed by their private network address from outside the private network 140.

The private network 140 and other components in FIG. 1 may utilize any number and type of communication protocols, also referred to as the Internet Protocol ("IP"), or as the Transmission Control Protocol/Internet Protocol ("TCP/IP"). For example, the private network 140 may have address ranges as set by RFC 1918 for Internet Protocol Version 4 or IPv4 and RFC 4193 for Internet Protocol Version 6 or IPv6.

Application servers 141-143 provide services over the network 140 to other computing devices. Any number and type of application servers and associated services may be used in conjunction with embodiments of the present disclosure, such as mail servers, file servers, Customer Relationship Management or CRM services, Enterprise Resource Planning or ERP services, and/or document management services.

A data connection may be established with any of application servers 141-143 by opening a communication socket with the respective application server on a port (or port range) associated with the service. Application servers 141-143 may correspond to physical devices with a physical networking interface associated with a private network address. Alternatively, application servers 141-143 may also correspond to virtual server instances running on one or more physical servers. Virtual server instances may each have a virtual network interface with an associated private network address. Virtual server instances may include, as well as operate in conjunction with, one or more user space instances (also known as software containers, virtual engines, virtual private servers, and/or jails). Such user space instances may be implemented in any suitable manner, including via the DOCKER software tool.

In the example shown in FIG. 1, the private network 140 is separated from the external network 180 by a gateway 100, thereby allowing networking traffic between the external network 180 and the private network 140 in a controlled way. The system of FIG. 1 can identify clients 121, 122 as "trusted clients" having access rights to one or more of the application servers 141-143 within the private network 140 in order to use the services running thereon. The clients 121, 122 may be, or include, physical hardware and/or virtual components. For example, a client 121, 122 may include a virtual operating system running on a physical device, such as a mobile device. The system can also grant network access to a selection of the application servers 141-143 which the clients 121, 122 are allowed to access, and deny network access to any application server the clients 121, 122 are not allowed to access.

To control access by the clients 121, 122 to the application servers 141-143, the gateway 100 includes a tunnel module 101 for establishing networking tunnels upon request by the clients 121, 122 in the external network 180. In the example shown in FIG. 1, networking tunnels 181, 182 are established between the tunnel module 101 and the clients 121, 122 respectively, thereby extending the private network 140 to the clients 121, 122. In some embodiments, a virtual private network (or "VPN") is established through tunnels 181, 182. In this manner, a client 121, 122, although within network 180, is provided a private network address in the range of the private network 140, and thus can potentially access all application servers 141-143 by their respective private network address (provided access is allowed, as is discussed in more detail below).

A tunnel is established upon request of a client 121, 122, thereby providing tunnel authentication information to the tunnel module 101. Any amount and type of authentication information may be used in conjunction with embodiments of the present disclosure, such as a username and password. The tunnel authentication information may also (or alternatively) include biometrics, two-factor authentication, and/or other cryptographic methods. The data travelling in the tunnels 181, 182 may further be protected by encryption, such as according to the Internet Protocol Security (or "IPsec protocol,") Transport Layer Security (or "TLS") and/or Datagram Transport Layer Security (or "DTLS"). The tunnel authentication module 105 verifies the tunnel authentication information and, if the authentication is successful, the networking tunnel is established with the respective client.

The gateway 100 in FIG. 1 includes a firewall 102 for controlling the network traffic between the clients 121, 122 and the application servers 141-143 after the respective tunnels 181, 182 have been established. The firewall 102 may control such traffic according to firewall rules provided by the firewall configuration module 103 or from another source. In some embodiments, the firewall configuration module 103 obtains the firewall rules from client access lists received from the respective clients 121, 122 which, in turn, receive the client access list from the authentication server 160.

Among other things, the firewall rules allow a client 121, 122 to establish and maintain network connections with the application servers 141, 142 and 143. The selection of which application servers 141-143 the client 121, 122 can access to can be determined from the client access list from which the firewall rules are also obtained. The firewall rules may include any desired information. In some embodiments, for example, the firewall rules include entitlement tokens that define the information clients may have access to. Such entitlement tokens may be used to configure a firewall to not only grant/deny network traffic access, but also access to various files (e.g., that are classified (contain metadata) as highly confidential).

The firewall 102 may be, or include, any number and type of system, device, hardware component, and/or software component. For example, firewall 102 may be implemented as a distributed firewall that includes multiple hardware and/or software components. In some embodiments, the firewall 102 blocks all traffic from clients 121, 122 over the secure tunnels 180, 181 by default, but may be configured to allow traffic in response to a firewall rule. For example, if a client access list indicates that client 121 may access application server 141, the firewall configuration module 103 obtains the corresponding rule and activates it in the firewall 102. After activation of the rule, the firewall 102 no longer blocks network traffic on the private network 140 between the client 121 and the application server 141.

The system of FIG. 1 includes an authentication server 160, which in turn includes an authentication module 162 for authenticating clients 121, 122 and generating client information. In the example shown in FIG. 1, in order for a client 121, 122 to get access to an application server 141-143 in the private network 140, it first needs to authenticate itself with authentication server 160.

The authentication server 160 may be implemented using any desired combination of hardware and software components, and may communicate with other hardware and software components in any desired manner. In the exemplary system shown in FIG. 1, the authentication server 160 is not part of the private network 140, but is accessible by the clients 121, 122 over the network 180. The authentication information provided by the clients 121, 122 uniquely identifies the client or the user of the client, such as by providing a username and password (which can be verified by the authentication module 162).

Clients 121, 122 may be authenticated using any number and type of different authentication methods. For example, in addition (or as an alternative) to password authentication, the authentication may utilize an authentication based on the hardware of the client 121, 122, such the use history of the client hardware and hardware attributes of the client. In one embodiment, such information may be stored in a record on the client device, whereby detection of the movement of the record to a different machine results in an authentication failure. The record can be encrypted and/or key-signed to provide additional integrity. Authentication may also be based on a time window, such that authentication is denied (or further authentication required) if a client 121, 122 attempts authentication outside a predetermined time window.

Authentication may be performed based on location-based information, such as based on the Internet protocol (IP) address of the client 121, 122 or global positioning information associated with the client 121, 122. For example, the physical location of the client 121, 122 may be determined from global positioning information, a specific IP address, or even the country code of the IP address of a client, and used to determine whether the client 121, 122 is a bona fide client or a third party (such as a hacker) attempting to pose as the client. IP addresses (individual or ranges based on country code, etc.) may be blacklisted or whitelisted based on previous history (i.e., hacking attempts, authentication failures, etc.). Likewise, location-based information used for authentication may also be derived from the physical network(s) used by the client 121,122 in attempting a connection.

The authentication module 162 may also receive context or status information directly from the clients 121, 122. When such information is received directly from the client, and thus cannot be verified by the authentication server, it may be treated as untrusted "client context information." The client context information which may be included in the client information may include information such as: a hostname which may be in the form of a fully qualified domain name (or "FQDN"), for example "host.domain.com"; a family and a version number of the operating system running on the host; a patch level indicative for which patches have been applied to the operating system; a status of anti-virus software installed on the client; and/or how long the user of the client device has been logged onto the client.

The authentication module 162 may also add "trusted client information" to the client information, which may include information such as user membership information indicative for user groups and departments the user belongs to. The trusted client information may be provided by user directory systems using lightweight directory access protocol ("LDAP") or Active Directory ("AD") services. Trusted client information may also include information such as history information on previous sessions of the client with the authentication server 160 (e.g., a last login timestamp and an amount of failed login attempts).

In the example shown in FIG. 1, the authentication module 162 comprises a client list engine 163 and a tunnel list engine 165. Upon successful authentication by the authentication module 162, the tunnel list engine 165 generates a client tunnel list and the client list engine 163 generates a client access list based on the client information provided by the authentication module.

The client tunnel list may include all information for an authenticated client 121, 122 to establish the respective tunnel 181, 182. The client tunnel list may include, for example, network address information (such as the destination IP address and/or destination port number of the gateway 100) in order for the client 121, 122 to initiate the establishment of the respective tunnel 181, 182 by requesting the setup of a tunnel at the IP address and port number specified in the client tunnel list. The client tunnel list may also include the tunnel authentication information in order to authenticate the client 121, 122 with the authentication module 105 in the gateway 100. The client tunnel list may include, for example, virtual private network (VPN) tokens that contain the information necessary to connect the client to various gateways.

The tunnel authentication information generated by the tunnel list engine 165 may be dynamic (i.e., not known by the gateway's 100 authentication module 105 beforehand). In such cases, the authentication server may forward the tunnel authentication information to the gateway 100 by a communication link 168 between the authentication server 160 and the gateway 100. The communication link 168 thus provides a channel between the gateway 100 and authentication server 160 that allows configuration updates to be exchanged and allowing access by a user or session to be revoked if the user and/or session is deleted in the authentication server 160. There are a variety of reasons why a user or session may be removed, such as: 1) the service database changes and the administrator wants to enforce the change on all users; 2) a user changes his or her authentication method; or 3) a user or client is banned from the system. The communication link 168 may be implemented in any desired manner, such as via a hypertext transfer protocol secure (HTTPS) channel that only allows communication between the authentication server 160 and one or more from one or gateways.

The client access list identifies a selection of the application servers 141-143 to which a client is granted access. In some embodiments, the client list engine 163 generates the firewall rules for the firewall 102 and includes these rules in the client access list. The firewall rules are then extracted from the client access list by the firewall configuration module 103 in the gateway 100 and applied to the firewall 102. The client access list may further add conditions to the addressing information of the application servers 141-143. An illustrative example of a client access list is show in the table below.

TABLE 1

| Client access list with conditional application servers | |
|---|---|
| IP Address | Condition |
| 10.0.0.1 | TimeInterval(09.00-17.00) |
| 10.0.0.11 | Domain("domain.com") |
| 10.0.0.3 | StringPrefix(username, "adm_") |

The first column of Table 1 specifies the IP address of the application server to which the client is granted network access to. The second column further specifies a condition that needs to be fulfilled in order to have the access. The first condition specifies a specific time interval during which the client is granted access to the application server 10.0.0.1. The second condition specifies a specific domain from which the request should originate (i.e., it specifies the domain from which the client may access the application). The second condition may be used, for example, by a company to only allow access from its own domain (i.e., from within the company's network). The third condition could be used to identify a specific user or group, (such as a company's administrators), which are the only ones that should be able to access a given application server or other network device.

In the exemplary system shown in FIG. 1, the authentication server 160 includes a signature module 164 for creating digitally-signed lists, such as a signed client access list and signed client tunnel list. The digital signatures generated by the signature module 164 can be verified by the signature verification module 104 in the gateway 100 upon reception of the client access and tunnel list. The signature may be generated and verified by a signature key shared between the gateway and the authentication server 160 such that the client access list and client tunnel list is not alterable by the clients 121, 122 without the gateway 100 notifying the authentication server 160. In one exemplary embodiment, X.509 certificates using a private/public key mechanism are employed to verify the certificate.

In some embodiments, if the gateway 100, while attempting to verify the signature, determines that the client access list or client tunnel list was changed, the gateway 100 may notify the authentication server 160 of the changes and/or break the network tunnel with the client. The authentication server 160 may use such notifications as part of the "trusted client information" associated with the client in future interactions with the client. In some embodiments, the gateway 100 can break an established networking tunnel 181, 182 on its own volition (e.g., in response to detecting a change in the client access list or client tunnel list as described above). Additionally or alternatively, the authentication server 160 may be adapted to cause the gateway 100 to break established networking tunnels 181, 182 by sending a message to the gateway 100 over the communication link 168 instructing the tunnel module 101 to break a networking tunnel and to remove the firewall rules from the firewall allowing the respective client access to the application servers.

Figure 2:
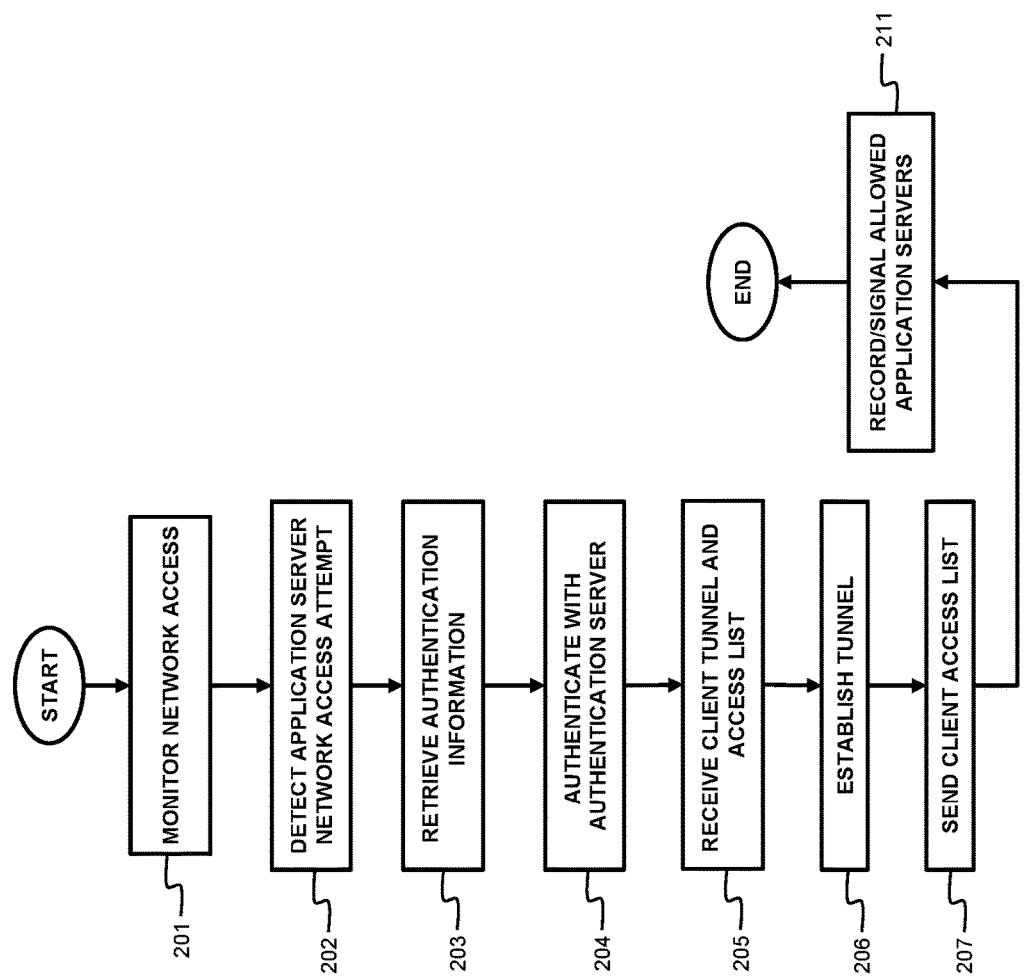
FIG. 2 is an exemplary process executed by a client device to gain network access to protected network devices according to various aspects of the disclosure.
Figure 3:
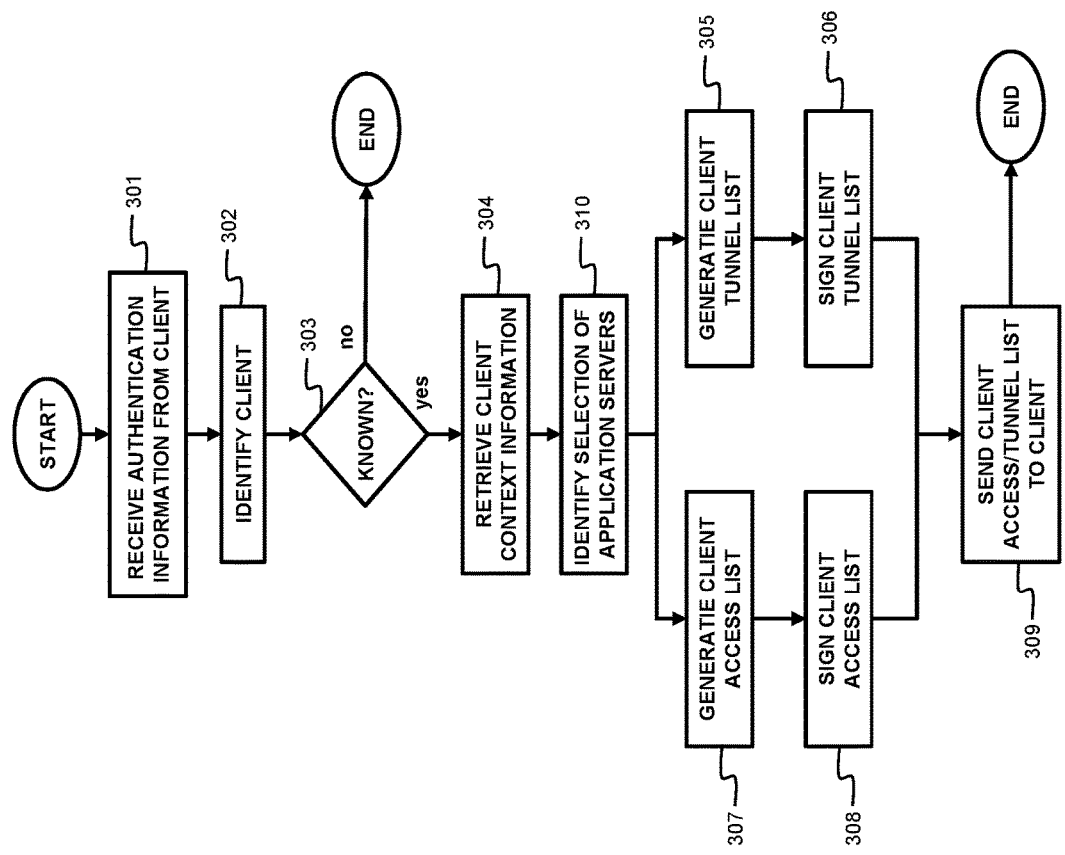
FIG. 3 is an exemplary process executed by an authentication server for providing a client access and tunnel list to a client device allowing this client network access to protecting network devices according to various aspects of the disclosure.
Figure 4:
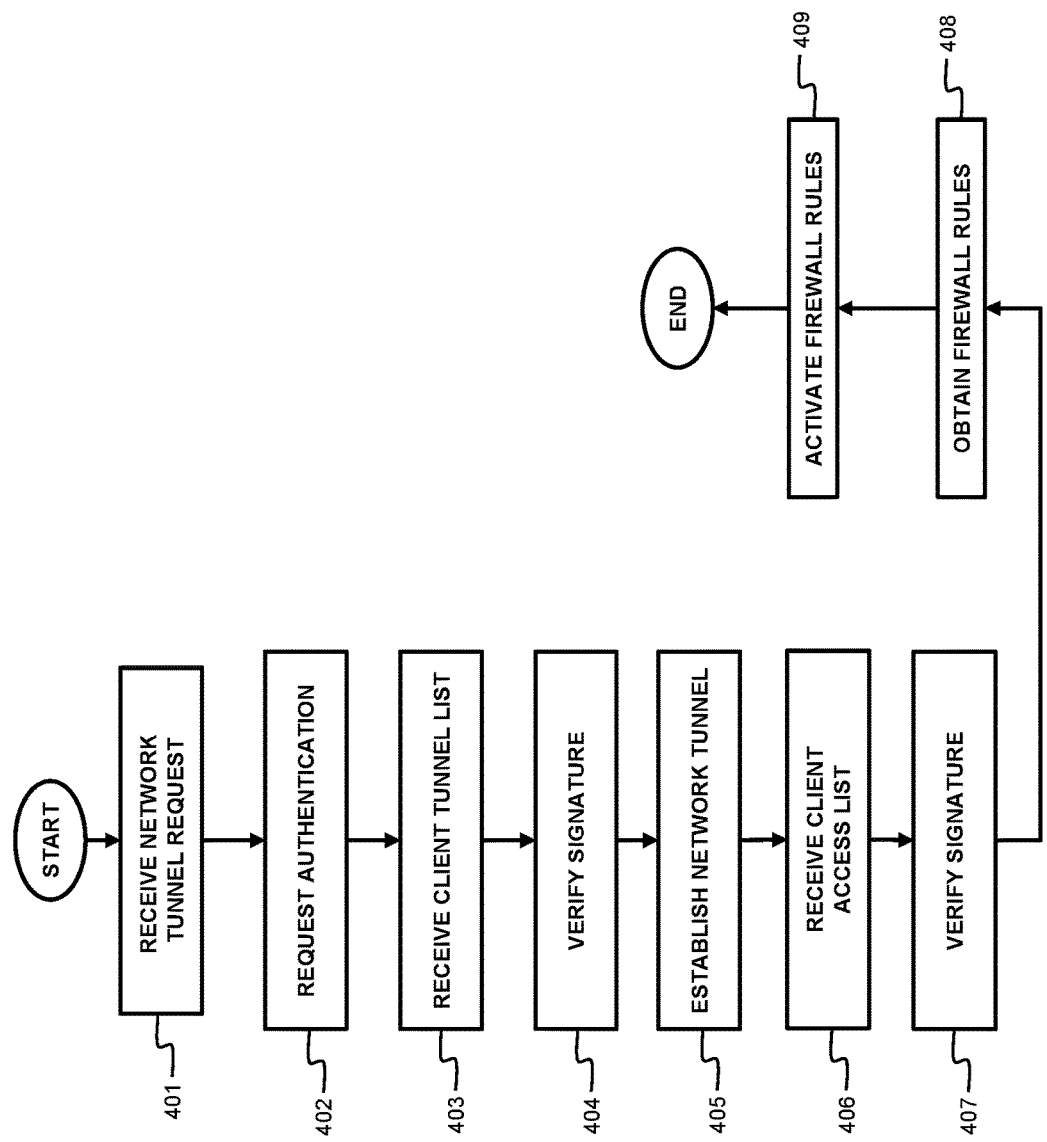
FIG. 4 is an exemplary process executed by a gateway to provide a client access to protected network devices behind a firewall in this gateway according to various aspects of the disclosure.

FIGS. 2, 3 and 4 show exemplary processes that may be executed by various components operating in conjunction with embodiments of the present disclosure, including the components of the exemplary system shown in FIG. 1, namely the client 121, 122, authentication server 160 and gateway 100, respectively. The processes described herein may be performed (in whole or in part) by any other combination of different hardware and/or software components.

The processes in FIGS. 2, 3, and 4 may be implemented in a variety of contexts and situations, such as where the application servers 141, 142 and 143 all belong to a company which aim it is to provide the services of the application servers in a secure way to the trusted clients 121, 122. In such cases, a "trusted client" is a client device of which the user or the device itself is known to the company and may be provided access to one or more of the application servers. Each client 121, 122 may be implemented as any combination of computer hardware and/or software that can access and use a service made available by the application servers 141-143. A client may, for example, be (or include) a desktop computer, a laptop computer, a smartphone and/or a tablet computer. The client could also be (or include) a server that, for example, uses a certificate to authenticate itself. The processes in FIGS. 2, 3, and 4 help prevent clients 121, 122 from accessing the private network directly, instead only providing access through a gateway, (such as gateway 100 in FIG. 1). Such restrictions may also be enforced with regards to clients operating within the company's private network. For an example of such as scenario, referring again to FIG. 1, both network 180 and network 140 could be separate "private networks," but network communication between the clients 121, 122 and application servers 141-143 is still controlled the gateway 100.

FIG. 2 shows an exemplary process that may be executed by any of the clients 121, 122 to access one or more services on the application servers 141-143. The process in FIG. 2 may be implemented in any suitable manner, such as via a software application on the client device that runs automatically in the background when the client is active. The software application may run automatically at start-up time of the client, or it may be manually initiated by the user or another process operating on the client. The client 121, 122 monitors (201) the network access of the client devices to one of the applications servers 141-143. The network address of the application servers 141-143 may be a configuration option in client applications using the services of the application servers. For example, the application server may be (or include): a mail server with the network address and ports configured in the mail client application; a file server configured with its network address as a network share; a CRM service and the client has a dedicated client application installed for accessing the CRM service; and/or a web service and the user specifies the address in the address bar of a browser application.

The client may detect (202) that a client application tries to access application servers within the private network 140 based on the destination network address. The client retrieves (203) authentication information to send to the authentication server 160. Retrieval of the authentication information may be performed automatically such as by using the authentication credentials a user submitted previously to log on. Alternatively, retrieval of the authentication information may include requesting the user to provide authentication credentials, such as a username and a password. Alternatively to steps 201-203 of FIG. 2, the client may directly authenticate itself with the authentication server 160 without waiting for a network access attempt to one of the application servers 141-143. For example, the client may authenticate with the authentication server 160 when the user of the client logs on to the client or when the client boots.

Authentication of the client may be performed in any desired manner, such as by using stored authentication credentials, the user's logon credentials, and/or separate authentication credentials that are requested from the user. Any number and type of identity provider may be also used in conjunction with embodiments of this disclosure, including RSA, Oauth, certificates, Radius, SAML, and the like. The authentication credentials are used to authenticate (204) the client 121, 122 with the authentication server 160. In response, the client receives (205) the client tunnel list and the client access list from the authentication server 160.

The client 121, 122 establishes (206) the network tunnel 181, 182 with the gateway 100 by, for example, retrieving the network address of the gateway 100 from the client tunnel list and sending a request to the gateway 100 to establish the tunnel. Upon establishing (206) the tunnel, the client may provide the client tunnel list to the gateway as an authentication. The client tunnel list bears the signature of the authentication server 160, from which the gateway 100 may verify the client is trusted and establish the tunnel without further exchange of authentication credentials. After the network tunnel is established, the private network 140 extends to the client through the tunnel, but the client may still not be able to access any of the application servers 141-143, as network access to the servers may be blocked by the firewall 102 of the gateway 100.

The client sends (207) the client access list received from the authentication server 160 to the gateway 100 and records (211) which application servers the client can access from the client access list. The client may also signal or display the accessible application servers or services to the user of the client device. Assuming successful authentication, the gateway 100 provides the client network access to all application servers or services on the application servers which are listed in the client access list.

FIG. 3 is an exemplary process for providing client access and tunnel lists to clients that may be executed by an authentication server, such as the authentication server 160 in FIG. 1. In this exemplary process, the authentication server receives a request from a respective client (301). In the request, the client provides authentication information for identification with the authentication server such as in step 204 of FIG. 2. The authentication server attempts to identify (302) the client. If the client is not known to the authentication server and is thus untrusted, the server stops the flow (303). If the client is known, the authentication server retrieves (304) trusted client information and adds it to the client information. Client context information received with the authentication information in step 301 may also be added to the client information.

The authentication module identifies (310) a selection of application servers the client is allowed to access. The selection of application servers, together with the client information, may then be forwarded to the client list engine 163 and tunnel list engine 165 of the authentication server 160. The tunnel list engine 165 generates (305) the tunnel list based on the client information by, for example, providing the IP address of the gateway 100 together with authentication credentials for setting up the networking tunnel with the gateway 100. The client tunnel list is signed (306) by the signature engine 164. The authentication server generates (307) the client access list based on the selection of servers the client is allowed to access. Based on the client information, further conditional restrictions may be added to the client access list. Then, also the client access list is signed 308. The authentication server then sends 309 the client access and tunnel list to the client.

FIG. 4 shows an exemplary process for providing network access to a client that may be executed by a gateway operating in conjunction with embodiments of the present disclosure, such as gateway 100 in FIG. 1. In this exemplary process, the gateway 101 receives (401) a request from a client 121 or 122 to setup the networking tunnel (e.g., a VPN connection) with that client. In response, the gateway requests (402) authentication credentials from the client and receives (403) the authentication credentials in the form of the client tunnel list. In order to authenticate the client, the gateway 100 verifies (404) the signature in the client tunnel list using a signature key shared with the authentication server 160. If the signature is correct and the client tunnel list was not modified by the client, the gateway 100 establishes (405) the networking tunnel with the client, thus extending the private network 140 to the client over the tunnel. The firewall of the gateway is further configured to block all network access from the client by default. The gateway receives (406) the client access list from the client that was generated by the authentication server and verifies (407) the signature in this client access list. From the client access list, the gateway obtains (408) the firewall rules for allowing network access to the application servers listed in the client access list (and the conditions for such access, which are also provided in the client access list). The gateway activates (409) the firewall rules, thereby allowing the client to access the selection of application servers listed in the client access list.

In some embodiments, the authentication server 160 may add enhanced authentication requirements to the client access list together with a second selection of application servers that may be accessed upon fulfilling these enhanced authentication requirements. These enhanced requirements may relate to the authentication mechanism itself and may, for example, state that a more secure authentication mechanism (relative to the first selection of application servers) must be used. For example, instead of supplying a user/password combination (which may satisfy the authentication requirements for the first set of application servers), the enhanced requirements may specify that two factor authentication is required to gain access to the second set of application servers. The requirements may also relate to the context or status information of the client itself. Any desired requirements may be used, such as a requirement: that all patches need to be applied to the clients operating system in order to access a certain application server; that a virus scanner must be running and be up to date to access a certain application server; and/or that an application server may not be accessed from a public wireless network.

Upon authentication with the authentication server, the authentication server 160 (e.g., via client list engine 163) provides a signed client access list comprising the enhanced authentication requirements together with a second selection of application servers requiring such enhanced authentication. When the client authenticates and fulfills the enhanced authentication requirements, the authentication server may issue an updated client access list to the client where the second selection of application servers is listed among the application servers that the client is allowed to access. Multiple levels of enhanced authentication requirements (and corresponding sets of application servers) may be listed in a client access list.

Figure 5:
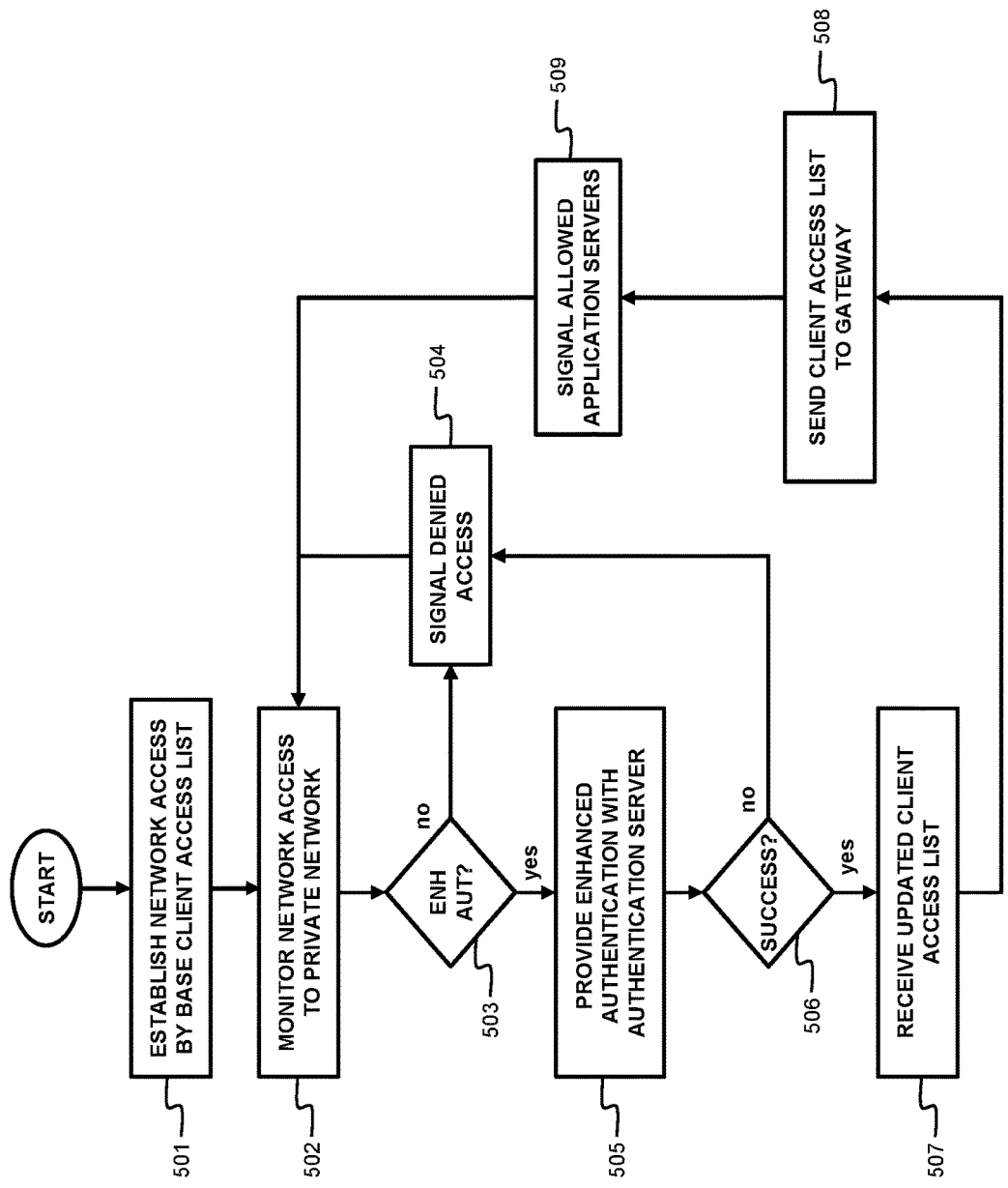
FIG. 5 is an exemplary process executed by client device to gain network access to a second selection of network devices behind a firewall of a gateway after having gained access to a first selection of these network devices according to various aspects of the disclosure.

FIG. 5 shows an exemplary process that may be executed by a client in order to gain network access to application servers with enhanced authentication requirements. In this exemplary process, the client establishes network access (501) to a first selection of application servers in the private network 140 listed in a first client access list, also referred to herein as the "base client access list." Step 501 may be further implemented according to the flow outlined in FIG. 2 with the difference that the base client access list further comprises a second selection of application servers and enhanced authentication requirements in order to gain network access to this second selection.

The client monitors (502) applications running on the client device and the network access of such applications to the private network 140. If a client application tries to connect to an application server which is not part of the first selection, the client checks (503) if the application server is part of the second selection. If not, the client cannot gain access to this application server and a user of the client or the application may be notified of the denied access (504). If the application server is part of the second selection, the client starts the enhanced authentication process with the authentication server (505), which may include requesting that the user provide enhanced authentication credentials such as a fingerprint scan, an iris scan, further biometric information about the user, and/or a key generated by an external key generator. The client may also request that the user update the context and/or state of the client device itself. For example the user may be requested to: connect the client to a wired network; not connect the client through a public wireless network; install the latest patches of the client's operating system; install a virus scanner; and/or update the virus scanner's database.

Upon the user successfully fulfilling the enhanced authentication requirements (506) the client receives (507) a second or updated client access list from the authentication server 160. If the enhanced authentication was not successful, the user or software application requesting network access is signaled or alerted (504) that network access was denied. The updated client access list lists both the first selection and second selection of application servers that the client can access, and is sent (508) to the gateway 100, which configures its firewall 102 accordingly. The client may then signal (509) to the client applications and user which applications or services are allowed.

Figure 6:
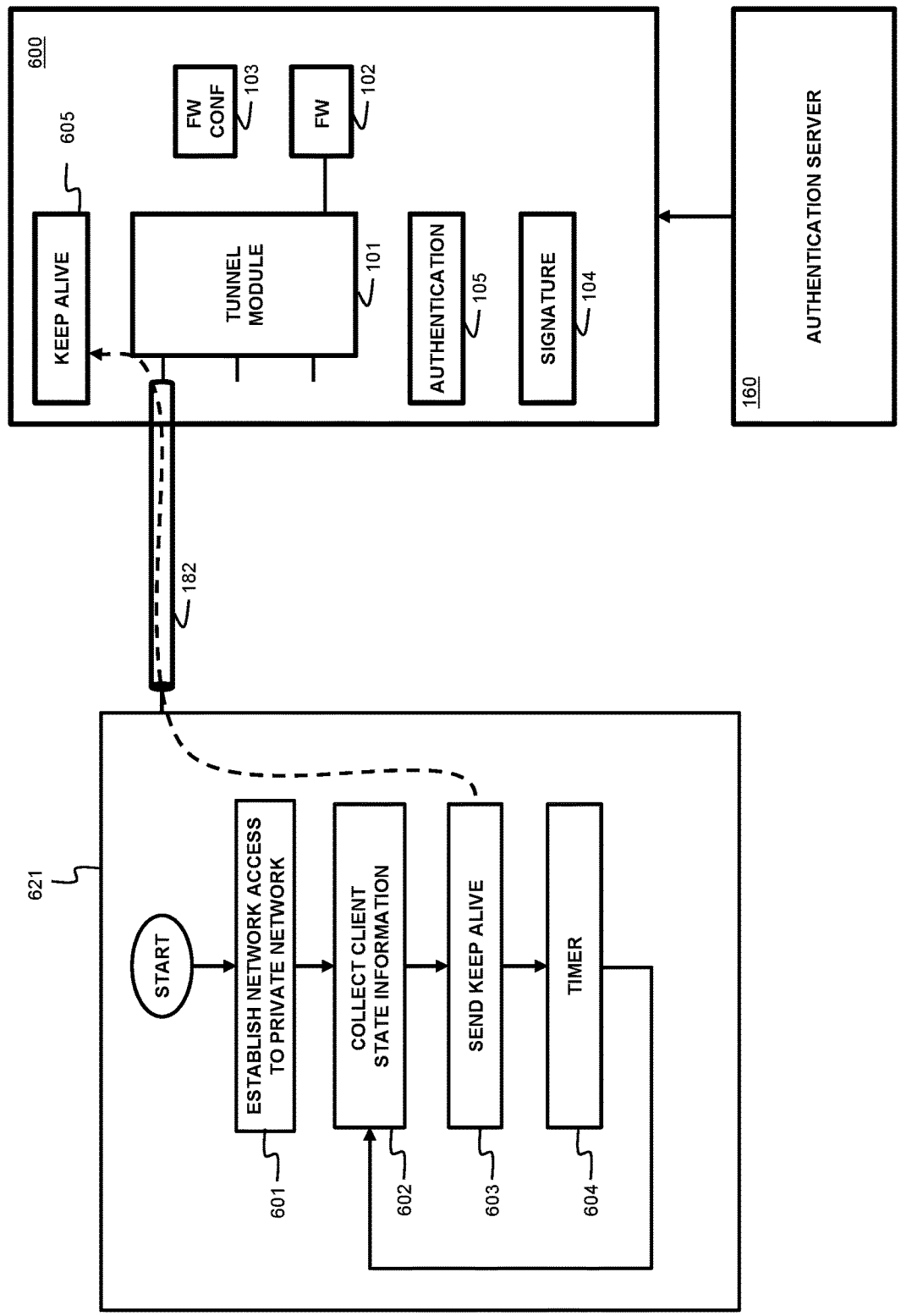
FIG. 6 illustrates an exemplary exchange of a keep alive message between a client device and a gateway in order to maintain a networking tunnel between the client and the client device according to various aspects of the disclosure.

FIG. 6 depicts an exemplary system according to various aspects of the present disclosure. In this exemplary system, the gateway 600 includes a keep alive module 605. The gateway 600 is connected over the established networking tunnel 182 with the client 621, and the keep alive module is configured to check that keep alive message are received at regular intervals from the client 621. If the keep alive message is not received in time, the keep alive module instructs the firewall configuration module 103 to clear the firewall rules for the client 621 from the firewall 102, and instructs the tunnel module 101 to break the networking tunnel 182. The keep alive module 605 may further be configured to check whether certain predefined state or context information about the client 621 is present in the keep alive message and fulfills certain predefined requirements. Such requirements may include, for example, that the client's virus scanner and/or firewall must be active.

The client 621 may execute the process illustrated by steps 601-604 in order to send the keep alive messages to the gateway 600. In the first step 601, a networking tunnel 182 to the gateway 600 is established. The networking tunnel 182 may be established in any desired manner, including using the process (or portions thereof) illustrated in FIGS. 2 and 5. The client collects (602) the required context and state information and formats it into a keep alive message. The keep alive message is sent (603) over the networking tunnel 182 to the keep alive module 605 of the gateway 600. When the message is sent, a timer is activated (604) to count down from a predefined time interval. When the timer expires, a new cycle of the steps 602-604 is performed in order to send the next keep alive message.

Figure 7:
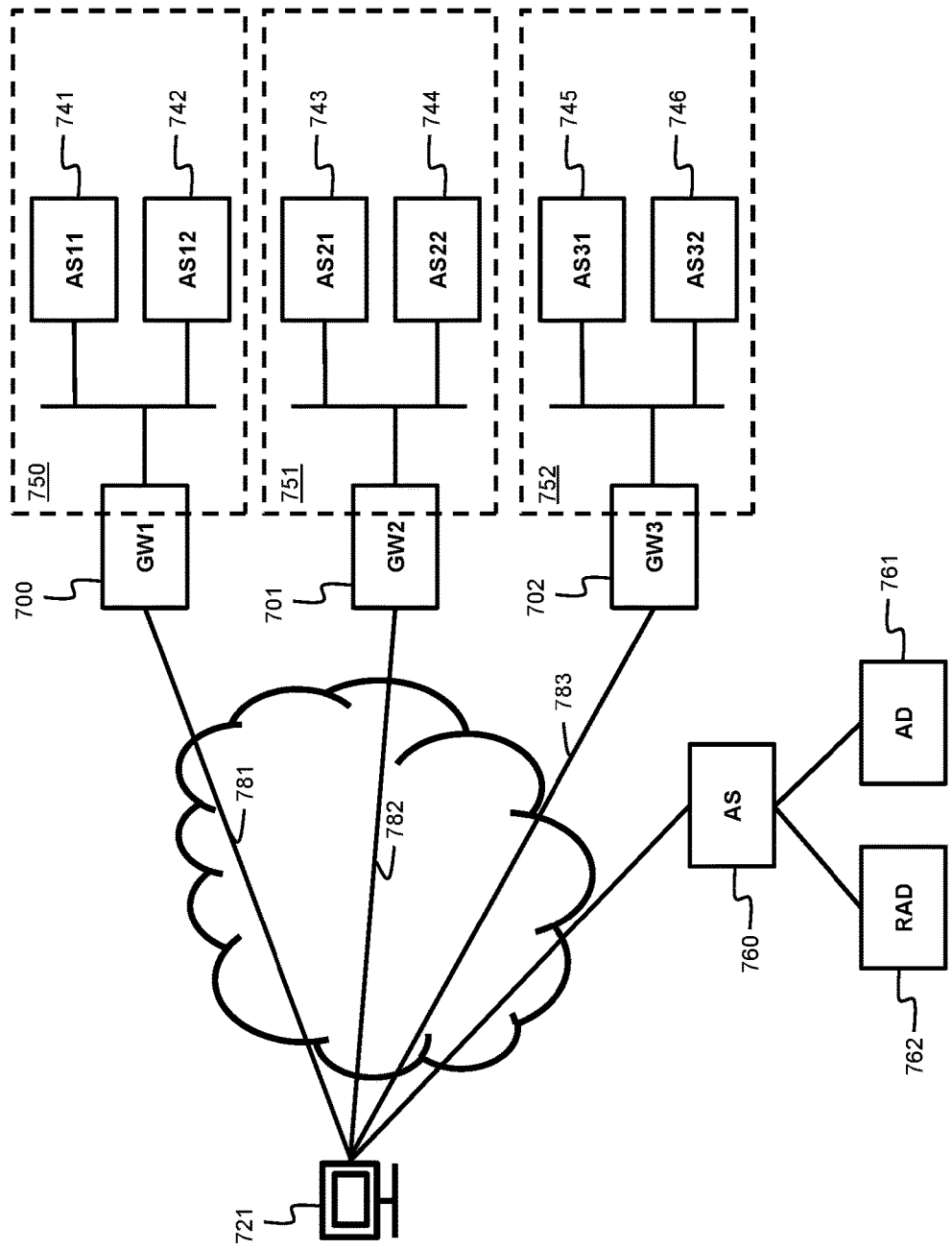
FIG. 7 illustrates an exemplary system for protecting network devices from network access by untrusted client devices according to various aspects of the disclosure.

FIG. 7 illustrates an exemplary system for protecting application servers 741 to 746 from unauthorized access according to various aspects of the present disclosure. In this example, the application servers 741-746 are part of private networks 750, 751 and 752 protected by the gateways 700, 701 and 702, respectively. A client 721 may authenticate with the authentication server 760 and thereby obtain a client tunnel list and client access list. The client tunnel list comprises information needed to establish a networking tunnel with each of the gateways 700-702 in order to extend all private networks 740-744 to the client 721. The client tunnel list may be in any suitable format, such as a single data object, a file with a single signature identifying all gateways, separate signed data objects, and/or files each identifying one of the gateways 700-702. Upon reception of the client tunnel list, the client 721 establishes a networking tunnel 781, 782 and 783 with each of the gateways 700-702.

The client access list includes a selection of the application servers 741-747 the client may connect to via the networking tunnels 781, 782 and 783. The client 721 sends the client access list to the gateways which, in turn, configure their firewall according to the received client access list, thereby allowing the client 721 access to the selection of application servers.

In some embodiments, the authentication server 760 may access other servers for authentication of the client 721 or for retrieving information about the client 721. This is also illustrated by FIG. 7, where the authentication server 760 may access the radius server 762 serving as an authentication backend for the authentication server 760. The authentication module 162 in the authentication server 760 then serves as an authentication interface to the client 721 while the server 762 performs the actual authentication. The authentication server 760 may also connect to the server 761 providing an Active Directory service the authentication server 760 to retrieve further profile information about the user of the client 721.

Figure 8:
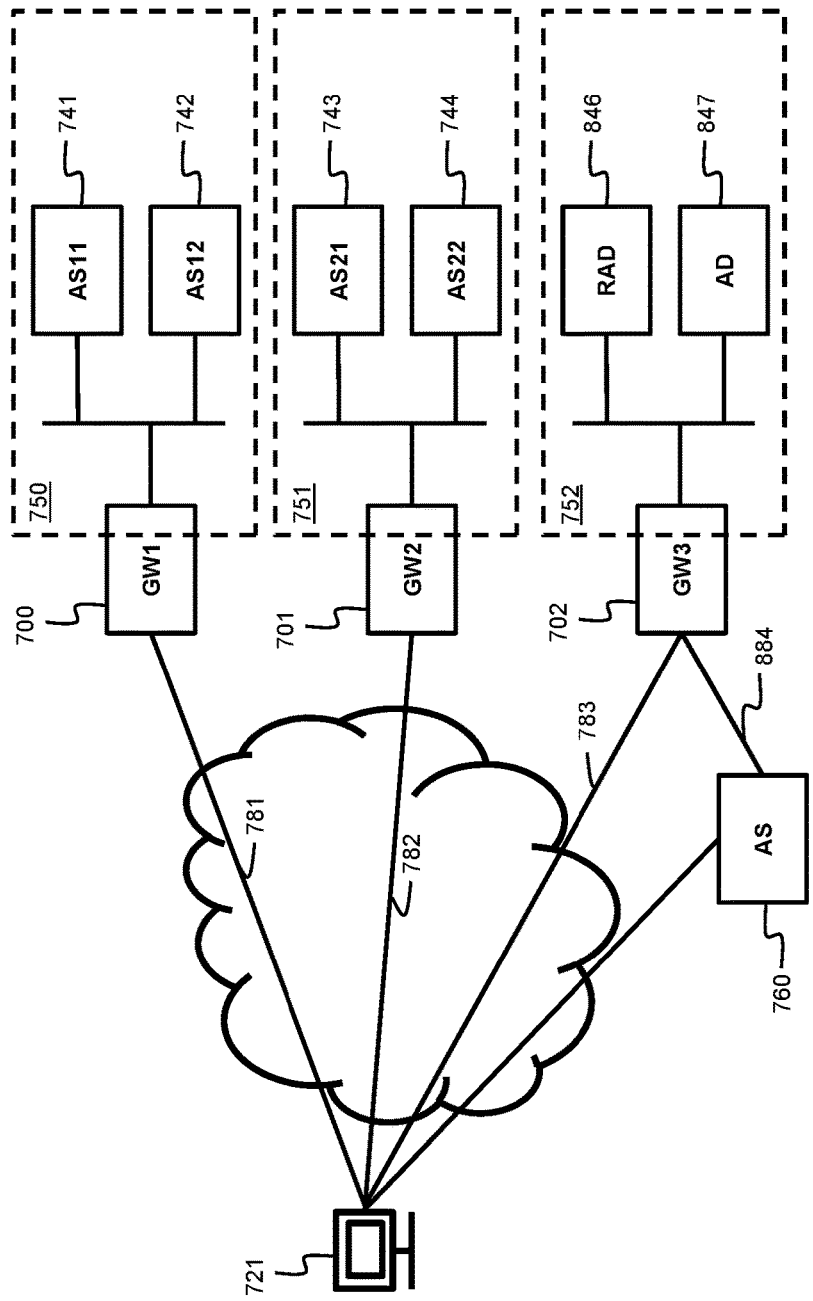
FIG. 8 illustrates an exemplary system for protecting network devices from network access by untrusted client devices according to various aspects of the disclosure.

FIG. 8 illustrates yet another exemplary system where the radius server 846 and the Active Directory server 847 correspond to application servers within the private network 744 behind the gateway 702, thereby helping to protect servers 846-847 from unauthorized access. To access the servers 846-847, the authorization server 760 may include permanent networking tunnel 884 with the gateway 702 protecting the servers 846 and 847. Alternatively, the authorization server 760 may utilize another mechanism to provide access to the servers 846-847, such as LDAP over JSON in order to leverage standard HTTPS traffic instead of using a network tunnel. The firewall rules allowing the authentication server 760 access to the servers may then be configured in the gateway 702 beforehand so that no client tunnel list or client access list is needed to establish the network connection between the authentication server 760 and the servers 846-847.

Figure 9:
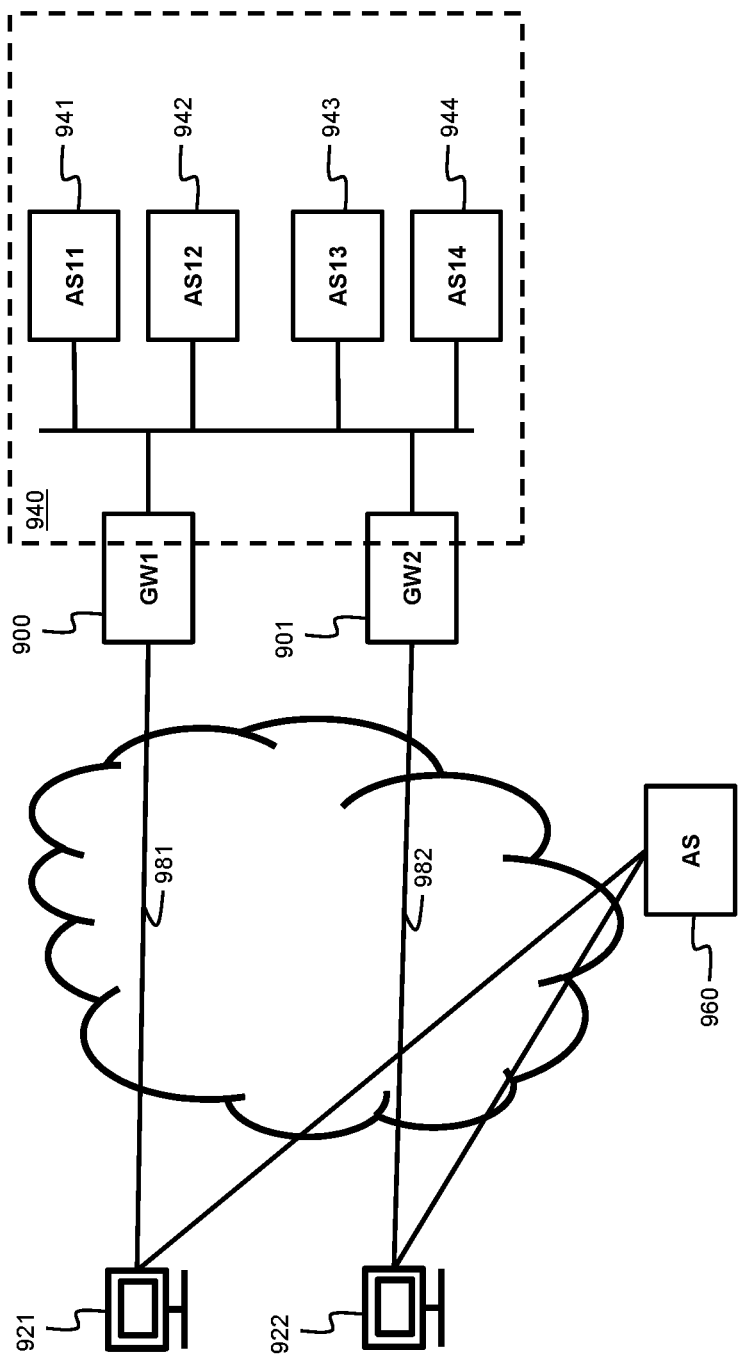
FIG. 9 illustrates an exemplary system for protecting network devices from network access by untrusted client devices where the networking load of a gateway is balanced by a second gateway according to various aspects of the disclosure.

FIG. 9 illustrates an example where multiple gateways 900, 901 are used to protect application servers 941-944 within a same private network 940. This topology may be used to balance the network traffic load between the multiple gateways 900, 901. The authentication server 960 provides client tunnel lists specifying a different gateway to the clients 921 and 922. In particular, client 921 establishes a networking tunnel 981 with gateway 900 and client 922 establishes a networking tunnel 982 with gateway 901.

The exemplary embodiments herein illustrate embodiments of the disclosure protecting application servers from unauthorized access. Apart from application servers, any other type of network device that provides a service and is addressable over a network may be protected by the embodiments of this disclosure. Likewise, network devices that may be protected by embodiments of the disclosure include networking equipment providing an administrator interface to routers and network level switches.

Figure 10:
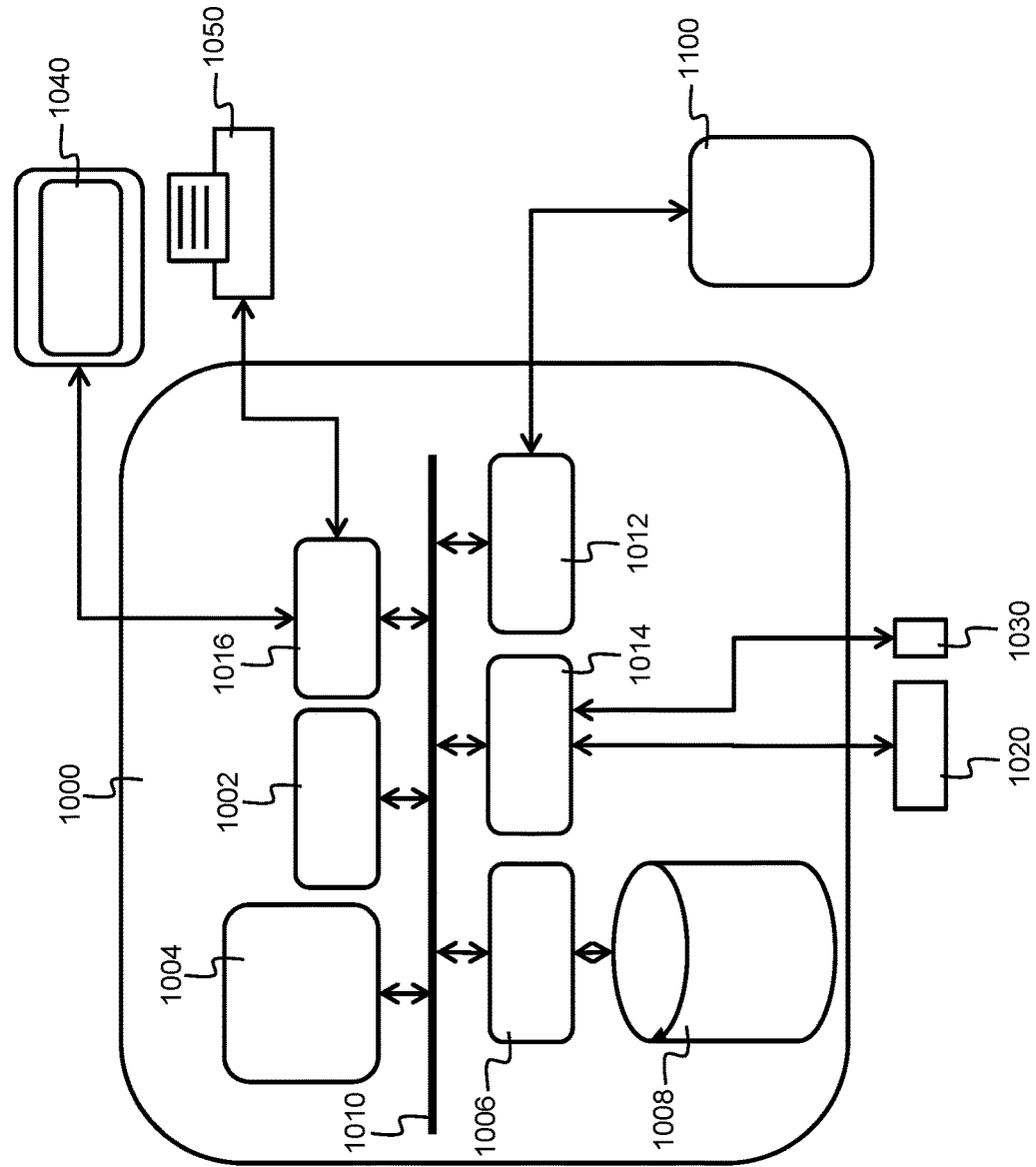
FIG. 10 illustrates an exemplary computing system according to various aspects of the disclosure.

FIG. 10 illustrates an exemplary computing system 1000 that may be utilized in conjunction with the embodiments disclosed herein. Computing system 1000 may be used as a client device, gateway, authentication server, and/or any other suitable system. Computing system 1000 comprises a bus 1010, a processor 1002, a local memory 1004, one or more optional input interfaces 1014, one or more optional output interfaces 1016, a communication interface 1012, a storage element interface 1006 and one or more storage elements 1008.

Bus 1010 may comprise one or more conductors that permit communication among the components of the computing system 1000. Processor 1002 may include any type of processor that interprets and executes programming instructions. Local memory 1004 may include a random access memory (RAM) or another type of dynamic storage device that stores information and instructions for execution by processor 1002 and/or a read only memory (ROM) or another type of static storage device that stores static information and instructions for use by processor 1002. Input interface 1014 may comprise one or more conventional mechanisms that permit an operator to input information to the computing device 1000, such as a keyboard 1020, a mouse 1030, a pen, voice recognition and/or biometric mechanisms, etc.

Output interface 1016 may comprise one or more conventional mechanisms that output information to the operator, such as a display 1040, a printer 1050, a speaker, etc. Communication interface 1012 may comprise any transceiver-like mechanism such as for example one or more Ethernet interfaces that enables computing system 1000 to communicate with other devices and/or systems 1100. The communication interface 1012 of computing system 1000 may be connected to such another computing system by means of a local area network (LAN) or a wide area network (WAN) such as for example the internet. Storage element interface 1006 may comprise a storage interface such as for example a Serial Advanced Technology Attachment (SATA) interface or a Small Computer System Interface (SCSI) for connecting bus 1010 to one or more storage elements 1008, such as one or more local disks, for example SATA disk drives, and control the reading and writing of data to and/or from these storage elements 1008. Although the storage elements 1008 above is described as a local disk, in general any other suitable computer-readable media such as a removable magnetic disk, optical storage media such as a CD or DVD, -ROM disk, solid state drives, flash memory cards, . . . could be used. The system 1000 described above can also run as a virtual machine above the physical hardware.

The methods illustrated herein can be implemented via programming instructions stored in local memory 1004 of the computing system 1000 for execution by its processor 1002. Alternatively the instructions can be stored on the storage element 1008 or be accessible from another computing system through the communication interface 1012.

The system 1000 may correspond to the client 121, 122, 621, 721, 921, 922 of the embodiments illustrated by FIGS. 1, 6, 7, 8 and 9 respectively. In such cases, the system 1000 may be connected to the gateway and authorization server by the communication interface 1012. Steps of the methods illustrated in FIGS. 2, 5 and 6 may be performed as instructions on the processor 1002 during execution and may be stored in memory storage 1004 or 1008.

The system 1000 may correspond to the gateway 100, 600, 700, 701, 702, 900 and 901 of the embodiments illustrated by FIGS. 1, 6, 7, 8 and 9 respectively. In such cases, the system may comprise two communication interfaces 1012, one communication interface for connecting to the private network and one for connecting to the other network by which it connects to the clients. Steps of the method illustrated in FIG. 4 may be performed as instructions on the processor 1002 during execution and may be stored in memory storage 1004 or 1008.

The system 1000 may correspond to the authentication server 160, 760 and 960 of the embodiments illustrated by FIGS. 1, 6, 7, 8 and 9. In such cases, the communication interface 1012 may be used to connect the system 1000 to the clients and gateways. Steps of the method illustrated in FIG. 3 may then be performed as instructions on the processor 1002 during execution and may be stored in memory storage 1004 or 1008.

Methods performed by the authentication server and gateway may further run on a same computer system, on separate computer systems, or as separate virtual computer systems on the same or different physical computer systems.

Communication among systems, devices, and components operating in conjunction with embodiments of the present disclosure may be performed using any suitable communication method, such as, for example, a telephone network, an extranet, an intranet, the Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Systems and devices of the present disclosure may utilize TCP/IP communications protocols as well as IPX, Appletalk, IP-6, NetBIOS, OSI, any tunneling protocol (e.g. IPsec, SSH), or any number of existing or future protocols.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: shipping data, package data, and/or any data useful in the operation of the system.

Various functionality may be performed via a web browser and/or application interfacing utilizing a web browser. Such browser applications may comprise Internet browsing software installed within a computing unit or a system to perform various functions. These computing units or systems may take the form of a computer or set of computers, and any type of computing device or systems may be used, including laptops, notebooks, tablets, hand held computers, personal digital assistants, set-top boxes, workstations, computer-servers, main frame computers, mini-computers, PC servers, network sets of computers, personal computers and tablet computers, such as iPads, iMACs, and MacBooks, kiosks, terminals, point of sale (POS) devices and/or terminals, televisions, or any other device capable of receiving data over a network. Various embodiments may utilize Microsoft Internet Explorer, Mozilla Firefox, Google Chrome, Apple Safari, Opera, or any other of the myriad software packages available for browsing the internet.

Various embodiments may operate in conjunction with any suitable operating system (e.g., Windows NT, 95/98/2000/CE/Mobile/, Windows 7/8, OS2, UNIX, Linux, Solaris, MacOS, PalmOS, etc.) as well as various conventional support software and drivers typically associated with computers. Various embodiments may include any suitable personal computer, network computer, workstation, personal digital assistant, cellular phone, smart phone, minicomputer, mainframe or the like. Embodiments may implement security protocols, such as Secure Sockets Layer (SSL), Transport Layer Security (TLS), and Secure Shell (SSH). Embodiments may implement any desired application layer protocol, including http, https, ftp, and sftp.

The various system components may be independently, separately or collectively suitably coupled to a network via data links which includes, for example, a connection to an Internet Service Provider (ISP) over the local loop as is typically used in connection with standard modem communication, cable modem, satellite networks, ISDN, Digital Subscriber Line (DSL), or various wireless communication methods. It is noted that embodiments of the present disclosure may operate in conjunction with any suitable type of network, such as an interactive television (ITV) network.

The system may be partially or fully implemented using cloud computing. "Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

Various embodiments may be used in conjunction with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically.

Any databases, systems, devices, servers or other components of the system may be located at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, and symmetric and asymmetric cryptosystems.

Embodiments may connect to the Internet or an intranet using standard dial-up, cable, DSL or any other Internet protocol known in the art. Transactions may pass through a firewall in order to prevent unauthorized access from users of other networks.

The computers discussed herein may provide a suitable website or other Internet-based graphical user interface which is accessible by users. For example, the Microsoft Internet Information Server (IIS), Microsoft Transaction Server (MTS), and Microsoft SQL Server, may be used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In another example, an Apache web server can be used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL and an IP address. The web server retrieves the appropriate web pages and sends the data or applications for the web pages to the IP address. Web services are applications that are capable of interacting with other applications over a communications means, such as the Internet.

Various embodiments may employ any desired number of methods for displaying data within a browser-based document. For example, data may be represented as standard text or within a fixed list, scrollable list, drop-down list, editable text field, fixed text field, pop-up window, and the like. Likewise, embodiments may utilize any desired number of methods for modifying data in a web page such as, for example, free text entry using a keyboard, selection of menu items, check boxes, option boxes, and the like.

The exemplary systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like.

The systems and methods of the present disclosure may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Changes and modifications may be made to the disclosed embodiments without departing from the scope of the present disclosure. These and other changes or modifications are intended to be included within the scope of the present disclosure, as expressed in the following claims.

What is claimed is:

1. A computer-implemented method comprising:
   receiving, by a computer system implementing a gateway to a private network, a request from a client device for a network tunnel between the client device and a network device in the private network;
   sharing, by the computer system, a signature key between the gateway and an authentication server, and a client access list including a list of network devices the client device is allowed to communicate with; and
   authenticating the client device by the computer system by at least verifying a digital signature via the signature key shared between the gateway and the authentication server and verifying that the network device is part of the list of network devices the client device is allowed to communicate with.

2. The method of claim 1, wherein the authentication server is a part of an external network separate from the private network.

3. The method of claim 2, wherein the authentication server is accessible by the client device over the external network.

4. The method of claim 1, further comprising:
   establishing, by the computer system, the network tunnel between the client device and the network device in the private network through the gateway.

5. The method of claim 1, wherein the network device in the private network includes an application server providing a service, and wherein the application server includes one or more of:
   a mail server providing a mail service;
   a file server providing networked data storage; and
   a web server providing hosting services.

6. The method of claim 1, wherein the network device in the private network includes one or more of a router and a switch providing administrator access.

7. The method of claim 1, wherein the computer system further implements a firewall for selectively blocking and allowing network traffic between the client device and the network device in the private network.

8. The method of claim 7, wherein the firewall blocks all network traffic between the client device and the network device in the private network by default.

9. The method of claim 7, further comprising:
   obtaining, by the computer system, a firewall rule for allowing network access between the client device and the network device in the private network; and
   configuring the firewall based on the firewall rule.

10. The method of claim 1, wherein establishing the network tunnel between the client device and the network device in the private network includes establishing a virtual private network.

11. The method of claim 1, further comprising receiving, by the computer system from the authentication server, a client tunnel list that includes information for establishing the networking tunnel.

12. The method of claim 11, wherein the client tunnel list includes a destination Internet protocol address and a destination port number of the gateway.

13. The method of claim 1, where authenticating the client device further includes enhanced authentication, and wherein the enhanced authentication includes enhanced authentication requirements that include a requirement selected from the group consisting of:
   a requirement that all patches need to be applied to an operating system on the client;
   a requirement that an up-to-date virus scanner must be running on the client; and
   a requirement that the client is not attempting to access the network device on the private network via a public wireless network.

14. The method of claim 1, where authenticating the client device further includes enhanced authentication, and wherein the enhanced authentication includes enhanced authentication requirements that include a requirement that a user of the client device provide an authentication credential selected from the group consisting of:
   a fingerprint scan;
   an iris scan; and
   a key generated by an external key generator.

15. The method of claim 1, further comprising:
   receiving, by the computer system, client status information from the client; and
   breaking the network tunnel in response to a failure to receive the client status information from the client at a regular time interval or in response to the client status information failing to correspond to predefined requirements for the client.

16. A non-transitory computer-readable medium storing instructions that, when executed, cause a computer system implementing a gateway to a private network to:
   receive a request from a client device for a network tunnel between the client device and a network device in the private network;
   share a signature key between the gateway and an authentication server, and a client access list including a list of network devices the client device is allowed to communicate with; and
   authenticate the client device by at least verifying a digital signature via the signature key shared between the gateway and the authentication server and verify that the network device is part of the list of network devices the client device is allowed to communicate with.

17. The computer-readable medium of claim 16, wherein the authentication server is a part of an external network separate from the private network.

18. The computer-readable medium of claim 17, wherein the authentication server is accessible by the client device over the external network.

19. A computer system implementing a gateway, the computer system comprising:
- a processor; and
- a non-transitory memory in communication with the processor and storing instructions that, when executed by the processor, cause the computer system to:
- receive a request from a client device for a network tunnel between the client device and a network device in a private network;
- share a signature key between the gateway and an authentication server, and a client access list including a list of network devices the client device is allowed to communicate with; and
- authenticate the client device by at least verifying a digital signature via the signature key shared between the gateway and the authentication server and verify that the network device is part of the list of network devices the client device is allowed to communicate with.

20. The computer system of claim 19, wherein the authentication server is a part of an external network separate from the private network, and wherein the authentication server is accessible by the client device over the external network.

* * * * *